United States Patent
Fillep et al.

(10) Patent No.: US 11,014,473 B2
(45) Date of Patent: May 25, 2021

(54) ADJUSTABLE HEIGHT LIMITER

(71) Applicant: GRAMMER AG, Amberg (DE)

(72) Inventors: Johannes Fillep, Birgland (DE); Florian Schanderl, Schwarzenfeld (DE)

(73) Assignee: GRAMMER AG, Ursensollen (DE)

( * ) Notice: Subject to any disclaimer, the term of this patent is extended or adjusted under 35 U.S.C. 154(b) by 126 days.

(21) Appl. No.: 16/454,932

(22) Filed: Jun. 27, 2019

(65) Prior Publication Data
US 2020/0001750 A1   Jan. 2, 2020

(30) Foreign Application Priority Data

Jun. 28, 2018 (DE) .......................... 102018115607.3

(51) Int. Cl.
*B60N 2/16* (2006.01)
*F16F 9/56* (2006.01)

(52) U.S. Cl.
CPC .......... *B60N 2/1665* (2013.01); *B60N 2/168* (2013.01); *B60N 2/1625* (2013.01); *F16F 9/56* (2013.01)

(58) Field of Classification Search
CPC ...... B60N 2/1665; B60N 2/161; B60N 2/162; B60N 2/164; B60N 2/169; B60N 2/1685; B60N 2/1625; B60N 2/168; B60N 2/1889; B60N 2/2227; B60N 2/508; B60N 2/502; B60N 2/505; B60N 2/50; B60N 2/501; A47C 3/24; A47C 3/26; A47C 3/265; Y10T 403/32426; F16F 9/56; F16F 9/58; F16F 9/44; F16F 9/38; B60G 2500/30; B60G 17/021; B62K 2025/045

See application file for complete search history.

(56) References Cited

U.S. PATENT DOCUMENTS

| | | | | |
|---|---|---|---|---|
| 2,756,045 A | * | 7/1956 | Savory | B62K 25/06 267/218 |
| 3,618,927 A | * | 11/1971 | Nicholls | F16F 9/38 267/48 |
| 3,758,063 A | | 9/1973 | Lacey | |
| 3,760,911 A | | 9/1973 | Porter et al. | |
| 3,945,744 A | * | 3/1976 | Metz | E02D 17/083 403/317 |
| 3,985,388 A | * | 10/1976 | Hogan | B60N 2/163 297/216.17 |

(Continued)

OTHER PUBLICATIONS

Official Action for German Patent Application No. 102018115607.3, dated Mar. 4, 2019, 3 pages.

(Continued)

*Primary Examiner* — Kyle J. Walraed-Sullivan
(74) *Attorney, Agent, or Firm* — Sheridan Ross P.C.

(57) ABSTRACT

Adjustable height limiter for a vehicle seat, comprising: a main body with a slot having a first end and a second end, a piston rod element which is displaceable with respect to the main body and has a pin element which is guided in the slot, a sleeve element which is rotatable with respect to the main body and at least partially surrounds the main body, the sleeve element having a boundary which is helical with respect to the main body, the boundary being arranged between the first end and the second end when viewed in the extension direction of the slot, and the pin element being arranged between the first end and the boundary.

11 Claims, 4 Drawing Sheets

(56) References Cited

U.S. PATENT DOCUMENTS

| | | | | |
|---|---|---|---|---|
| 4,079,922 | A * | 3/1978 | Nicholls | B60G 15/063 267/218 |
| 4,087,071 | A * | 5/1978 | Parker | A47C 3/18 248/406.1 |
| 4,927,119 | A | 5/1990 | Frost | |
| 5,005,677 | A * | 4/1991 | Bucholtz | B60N 2/23 188/300 |
| 5,513,825 | A * | 5/1996 | Gutgsell | A47B 9/08 108/147 |
| 5,730,262 | A * | 3/1998 | Rucks | F16F 9/58 188/321.11 |
| 5,950,996 | A * | 9/1999 | Pradel | B60G 15/061 267/221 |
| 6,138,973 | A * | 10/2000 | Woodward | A47C 3/26 248/188.5 |
| 6,296,089 | B1 * | 10/2001 | Koch | F16F 9/56 188/300 |
| 9,239,126 | B2 * | 1/2016 | Adamson | F16M 11/22 |
| 2006/0027956 | A1 * | 2/2006 | Adoline | F16F 9/0218 267/70 |
| 2014/0291943 | A1 * | 10/2014 | Murakami | B60G 17/08 280/5.514 |
| 2017/0274722 | A1 * | 9/2017 | Kasuga | B62K 25/04 |
| 2017/0350467 | A1 * | 12/2017 | Bohrer | F16F 9/44 |
| 2018/0363724 | A1 * | 12/2018 | McCullough | F16F 9/3292 |
| 2020/0122612 | A1 * | 4/2020 | Fillep | B60N 2/525 |
| 2020/0262319 | A1 * | 8/2020 | Abe | B60N 2/1615 |

OTHER PUBLICATIONS

Extended Search Report for European Patent Application No. 19180624.9, dated Nov. 29, 2019, 3 pages.

* cited by examiner

ADJUSTABLE HEIGHT LIMITER

CROSS-REFERENCE TO RELATED APPLICATIONS

This application claims the benefit of German Patent Application No. 10 2018 115 607.3 filed Jun. 28, 2018, the disclosure of which is incorporated herein by reference.

FIELD

The invention relates to an adjustable height limiter for a vehicle seat.

BACKGROUND

Height limiters for a vehicle seat are known from the prior art; in particular, such height limiters have only a lower end stop and an upper end stop, so that movement of the vehicle seat is limited and stopped at the bottom or top by the height limiter.

However, since people of different sizes can sit on the same vehicle seat, each person has a different feeling and need for height limitation of the vehicle seat. Height limiters are known from the prior art which display an adjustability of the height limitation, but have a very complex design and are cumbersome to use.

SUMMARY

It is accordingly an object of the present invention to provide an adjustable height limiter by means of which the aforementioned disadvantages of the prior art can be overcome.

The basic idea of the invention is to provide an adjustable height limiter for a vehicle seat, comprising: a main body with a slot having a first end and a second end, a piston rod element which is displaceable with respect to the main body and has a pin element which is guided in the slot, a first sleeve element which is rotatable with respect to the main body and at least partially surrounds the main body, the first sleeve element having a first boundary which is helical with respect to the main body, the first boundary being arranged between the first end and the second end when viewed in the extension direction of the slot, and the pin element being arranged between the first end and the first boundary.

Particularly preferably, the main body is cylindrical, the extension direction of the main body coinciding in particular with the extension direction of the slot.

According to a further preferred embodiment, the piston rod element is arranged to extend at least partially within the main body. Further preferably, the pin element is aligned perpendicular to the extension direction of the piston rod element, the extension direction of the piston rod element in particular being synonymous with the extension direction of the main body and the extension direction of the slot.

According to the invention, the first sleeve element, which is rotatable with respect to the main body, is provided and at least partially surrounds the main body. Particularly preferably, the first sleeve element surrounds the main body in a circumferential direction of the main body, but only partially in the extension direction of the main body.

Furthermore, according to the invention, the first sleeve element has a helical first boundary, that is to say that the first boundary is in contact with the surface of the preferably cylindrical main body. Particularly preferably, the helical first boundary has a single turn. Furthermore, the pitch of the helical first boundary is also predetermined and has a first value.

The operation of the height limiter according to the invention for a vehicle seat is as follows. Assuming that no sleeve elements were provided, the movement of the piston rod element would be limited by the first end and the second end of the slot, the contact of the guide pin with the first end representing a lower limit and the contact of the guide pin with the second end representing an upper limit.

By virtue of the fact that now, according to the invention, a first sleeve element is provided and the first boundary of the first sleeve element is arranged between the first end of the slot and the second end of the slot and the pin element is arranged between the first end and the first boundary, a limitation of movement of the piston rod element is limited on the one hand by the first end of the slot and on the other hand by the first boundary.

According to a particularly preferred embodiment, it is therefore advantageous if the pin element extends through the slot, that is to say that the pin element extends away from the main body, in particular an outer surface of the main body.

According to a further preferred embodiment, a second sleeve element which is rotatable with respect to the main body and at least partially surrounds the main body is provided, the second sleeve element having a helical second boundary, the second boundary being arranged between the first end and the pin element when viewed in the extension direction of the slot.

In particular, this means, therefore, that the pin element is now arranged between the first boundary and the second boundary.

If the first sleeve element and possibly the second sleeve element are rotated with respect to the main body, the distance between the first end and the first boundary or the distance between the first boundary and the second boundary changes due to the helical design of the sleeve elements.

In particular, the embodiments for the first sleeve element may also apply to the second sleeve element, so that the second sleeve element will not be additionally described below, if this does not seem necessary.

According to a particularly preferred embodiment, a first end of a first Bowden cable is connected to the first sleeve element, the first sleeve element being rotatable by actuation of the first Bowden cable.

Furthermore, it is conceivable that a first end of a second Bowden cable is connected to the second sleeve element, the second sleeve element being rotatable by actuation of the second Bowden cable.

By rotation of the first sleeve element and possibly the second sleeve element, the distance between the first end and the first boundary and possibly the distance between the first boundary and the second boundary are changed, in particular depending on the particular person who takes a seat on the vehicle seat.

The first end of the respective Bowden cable is such that only tensile forces are transmitted. After a rotation of a sleeve element in one direction, therefore, it is initially difficult to rotate the sleeve element in the other direction.

According to a further preferred embodiment, it is therefore advantageous that a first spring element comprising a first spring end and a second spring end is provided, the first spring end being connected to the main body and the second spring end to the first sleeve element. This has the effect that upon rotation of the first sleeve element restoring forces are generated by the first spring element that counteract the rotation of the first sleeve element.

According to a further preferred embodiment, it is therefore advantageous that a second spring element comprising a first spring end and a second spring end is provided, the first spring end being connected to the main body and the second spring end to the second sleeve element. This has the effect that upon rotation of the second sleeve element restoring forces are generated by the second spring element that counteract the rotation of the first second element.

The first spring element and possibly the second spring element are preferably formed as a torsion spring.

According to a further preferred embodiment, the first boundary is wave-shaped. This means that the first boundary has peaks and valleys, the valleys being preferably shaped such that the valleys can be brought into contact with the guide pin. The valleys can therefore be regarded as detents, the adjacent peaks preferably having a supporting effect.

According to an alternative embodiment, the first boundary has a first planar section and more preferably a second planar section. By virtue of the fact that the first boundary has a first flat section, the distance between the first end of the slot and the boundary can be adjusted steplessly.

According to a further preferred embodiment, a first fastening eye is arranged on the main body and a second fastening eye is arranged on the piston rod element, the first and the second fastening eyes each having an elastic element.

Particularly preferred are the dimensions of the fastening eye such that fastening to a corresponding location of the vehicle seat is possible.

Particularly preferably, the elastic element is made of Cellasto.

By using elastic elements, it is possible to attenuate and therefore reduce force spikes upon reaching the respective stop, thus the first end of the slot and the first boundary or the first boundary and the second boundary.

According to a further preferred embodiment, a first guide element is provided which is rigidly connected to the main body and is intended to guide the first Bowden cable. It is also conceivable that the guide element serves as an end stop for the first end of the first Bowden cable.

Preferably, a second guide element is provided when a second Bowden cable is provided for a second sleeve element.

In an alternative embodiment, the object is achieved by an adjustable height limiter for a vehicle seat comprising: a main body having a first cover element, a rotatably mounted base element displaceably arranged with respect to the main body and at least partially within the main body, the cover element having formed a first step when viewed in the transverse direction and the base element having formed a second step when viewed in the transverse direction, it being possible to bring the first step and the second step into contact.

In particular, the second step of the base element is opposite the first step.

By rotation of the base element, which is accompanied by a rotation of the second step, the second step is rotated with respect to the first step, and when there is contact, the steps therefore contact each other in a different way.

It is also conceivable that the base element may be connected to a Bowden cable and a spring element as the first sleeve element.

Furthermore, the underlying object is achieved by a vehicle seat having an adjustable height limiter according to an embodiment.

Further advantageous embodiments emerge from the dependent claims.

BRIEF DESCRIPTION OF THE DRAWINGS

Additional aims, advantages and expediencies of the present invention can be found in the following description in conjunction with the drawings. The drawings show.

DETAILED DESCRIPTION

Figure 1:
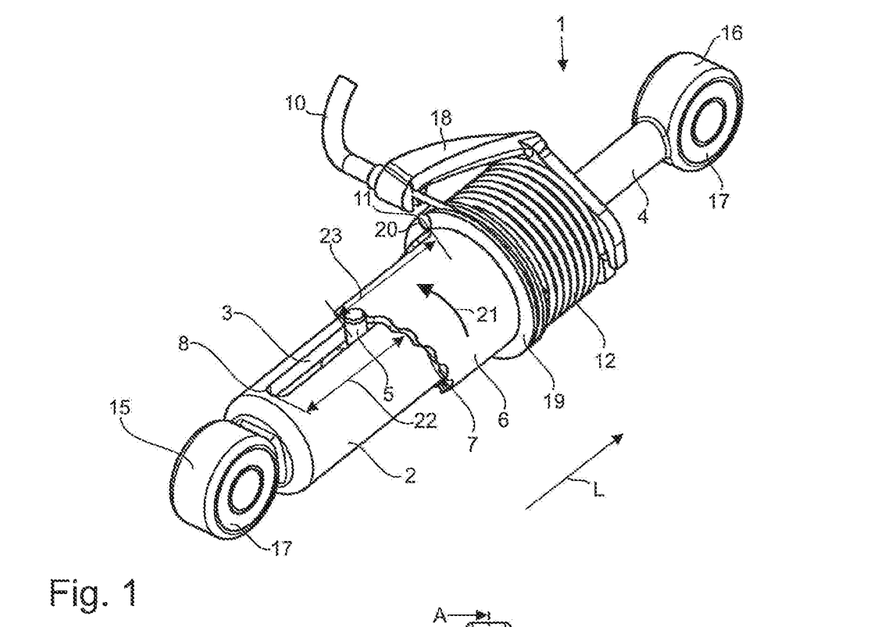
FIG. 1 a height limiter according to a preferred embodiment in a perspective view.

In FIG. 1, an adjustable height limiter 1 is shown with a main body 2, which has a slot 3, slot 3 having a first end 8 and a second end 9 (not shown here). A pin element 5 is guided through slot 3 and in particular protrudes through slot 3 and extends further from the top of main body 2. Pin element 5 is connected to piston rod element 4, piston rod element 4 having a second fastening eye 16. Likewise, a first fastening eye 15 is connected to main body 2. In particular, first fastening eye 15 and second fastening eye 16 have the same form and are aligned.

Next, a first sleeve element 6 having a first boundary 7 can be seen, first sleeve element 6 surrounding cylindrical main body 2 in the circumferential direction. First boundary 7 is arranged here between pin element 5 and second end 9 of slot 3, so that the end stops are given by first end 8 of slot 3 and first boundary 7 in a displacement of piston rod element 4 with respect to main body 2.

Arranged on first sleeve element 6 is a circumferentially extending guide rail 19, which has a recess 20. In recess 20, it is possible to mount a first end 11 of a first Bowden cable 10 and connect it to first sleeve element 6.

In addition, a first guide element 18 is provided which is rigidly connected to main body 2 and is intended to guide first Bowden cable 10.

By an actuation of first Bowden cable 10, where a pull is applied to first end 11 of first Bowden cable 10, first sleeve element 6 is rotated along arrow 21 and first boundary 7 between pin element 5 and second end 9 is changed accordingly, so that distance 22 between first end 8 of slot 3 and first boundary 7 changes, because first boundary 7 has a substantially helical design.

Furthermore, helical first boundary 7 has a single turn and a predetermined pitch 23. In particular, as seen in the circumferential direction, first end 11 of first Bowden cable 10 is arranged at the end of the turn of first boundary 7, that is, upon rotation of first sleeve element 6, the end of boundary 7 is the last assumable position of the first boundary between pin element 5 and second end 9.

In addition, a first spring element 12 is provided which is connected on one side to main body 2 and on the other side to first sleeve element 6. Preferably, first spring element 12 is a torsion spring. In particular, by the arrangement of first spring element 12 upon rotation of first sleeve element 6 restoring forces are generated which counteract the pull of Bowden cable 10, so that when no pull is exerted on first end 11 of first Bowden cable 10 and the Bowden cable is not locked, first end 11 of first Bowden cable 10 is reset to its original position, which can be predetermined. The original position is preferably the position in which distance 22 of first boundary 7 from first end 8 of slot 3 is minimal. The maximum position is accordingly the position in which distance 22 is at a maximum. By rotation of first sleeve element 6, distance 22 can be changed and accordingly the end stop.

Figure 2:
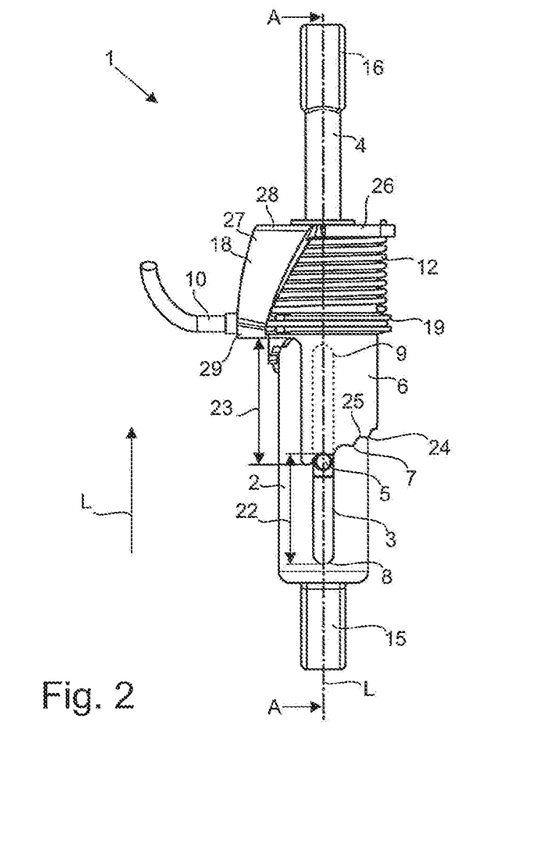
FIG. 2 the height limiter of FIG. 1 in a plan view.

FIG. 2 shows a plan view of height limiter 1 of FIG. 1, the hidden part of slot 3 being additionally shown in FIG. 2 with second end 9 of slot 3.

As can be seen, first boundary 7 is wave-shaped, that is to say both peaks 24 and valleys 25 are formed along first boundary 7 or the helix. In particular, valleys 25 are configured to receive pin element 5, adjacent peaks 24 aiding a certain locking of pin element 5.

First spring element 12 is in particular, as seen in the extension direction L, arranged between a first base section 26 of first guide element 18 and first guide rail 19, first base section 26 is rigidly connected to main body 2. Furthermore, first guide element 18 has a second base section 27 of first guide element 18 which is connected to first base section 26 on the one hand and to first Bowden cable 10 on the other hand in order to hold and guide first Bowden cable 10. In particular, second base section 27 extends in the extension direction L and is connected by means of a first end 28 to first base section 26, a second end 29 being formed to hold and guide first Bowden cable 10.

Particularly preferably, first Bowden cable 10 is held by first guide element 18 such that first Bowden cable between second end 29 of the second base section to first end 11 of first Bowden cable 10 is perpendicular to the extension direction L.

Figure 3:
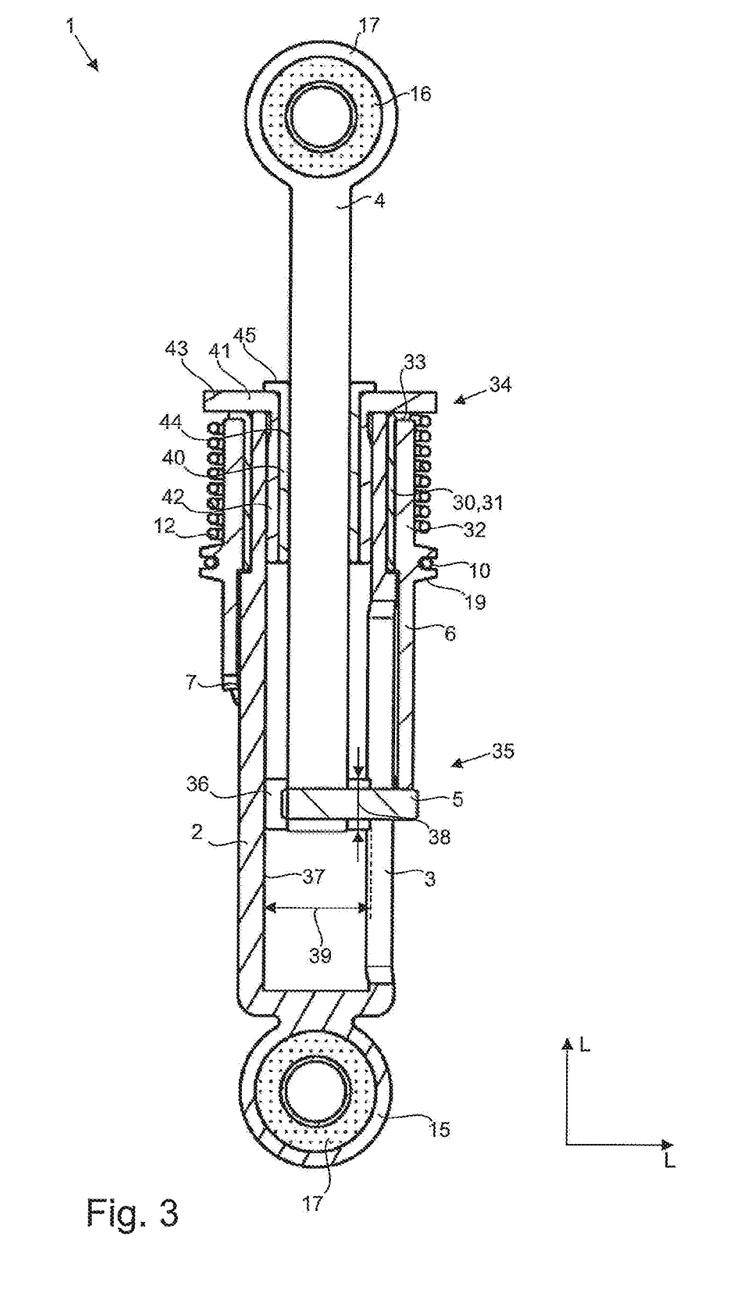
FIG. 3 a section of the height limiter of FIG. 2 along the line A-A.

In FIG. 3, the height limiter 1 of FIG. 2 is shown according to the section A-A shown. Further overlays of certain elements are described here in detail.

As can be seen, main body 2 has a first notch 30 perpendicular to the extension direction L' when seen in a direction L. In this notch 30, a first material entry 31 is introduced, which is on the one hand connected to main body 2 and on the other hand to first sleeve element 6, more preferably, the first material entry having a first section 32 and a second section 33, first section 32 extending mainly in direction of extension L and second section 33 extending mainly in direction L', that is to say, perpendicular to first section 32. As already mentioned, first sleeve element 6 is in contact with first material entry 31, thus, consequently with first section 32 and with second section 33. In particular, there is a first end 34 of first sleeve element. Particularly preferably, first material entry 31 is formed from a material which has sliding properties in order to facilitate the rotation of first sleeve element 6 with respect to main body 2.

According to the invention, pin element 5 is connected to piston rod element 4; more preferably pin element 5 is connected to a first end 35 of piston rod element 4, first end 35 being arranged within main body 2.

Furthermore, at first end 35 of piston rod element 4 is connected to a first sliding element 36 which is in contact with an inner surface 37 of main body 2. Preferably, first sliding element 36 is formed of a material having sliding properties. In this case, first sliding element 36 has a first extension 38 in the extension direction L and a second extension 39 in direction L' perpendicular to the extension direction L. Preferably, second extension 39 is greater than the extension of pin element 5 in extension direction L, first sliding element 36 partially surrounding pin element 5. Second extension 39 also corresponds to the extension of the interior of main body 2.

Further, a second sliding element 40 and a third sliding element 41 are provided, second sliding element 40 being in contact with piston rod element 4 on the one hand and with third sliding element 41 on the other hand, and third sliding element 41 being in contact with second sliding element 40 on the one hand and with main body 2 on the other hand, in particular with inner surface 37 of main body 2. Piston rod element 4 is correspondingly surrounded by second sliding element 40, and second sliding element 40 is surrounded by third sliding element 41, and third sliding element 41 is surrounded by main body 2.

Piston rod element 4 is therefore mounted so as to be guided by second sliding element 40 and third sliding element 41 with respect to main body 2.

Preferably, the second sliding element has a first section 42 and a second section 43, first section 42 extending in extension direction L and second section 43 extending in extension direction L' perpendicular to extension direction L. Likewise, the third sliding element has a first section 44 and a second section 45, first section 44 extending in extension direction L and second section 45 extending in the direction L' perpendicular to extension direction L.

Second section 43 may also represent first base section 26 of first guide element 18.

When viewed in extension direction L, second section 33 of first material entry 31 is arranged in front of second section 43 of second sliding element 40 and second section 43 of second sliding element 40 is arranged in front of second section 45 of third sliding element 41.

Figure 4A:
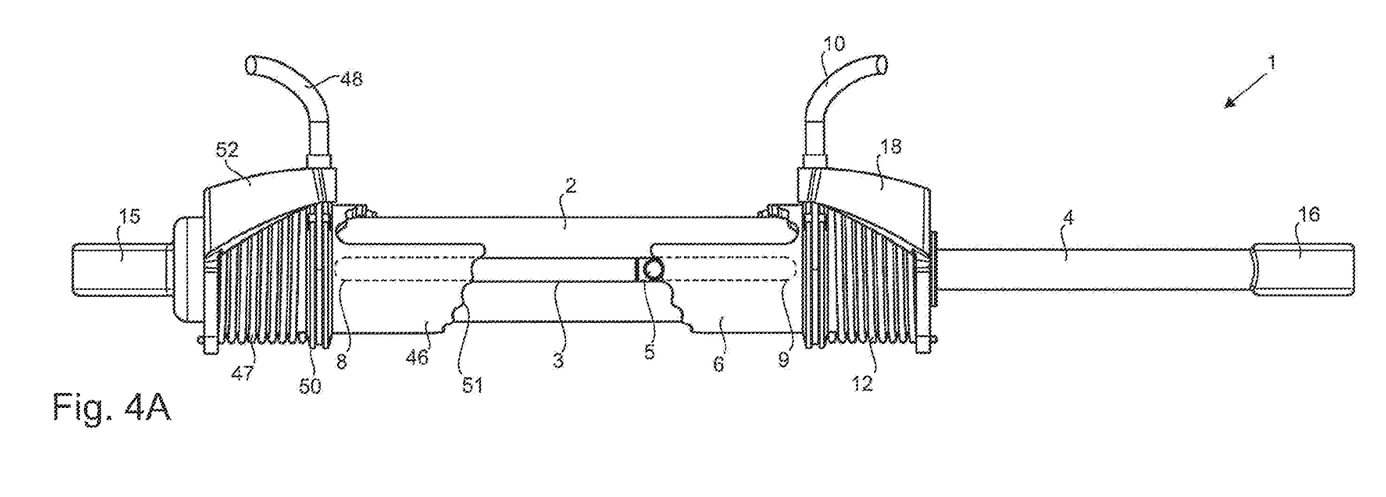
FIG. 4A a further embodiment of the height limiter according to FIG. 1 in a first side view.
Figure 4B:
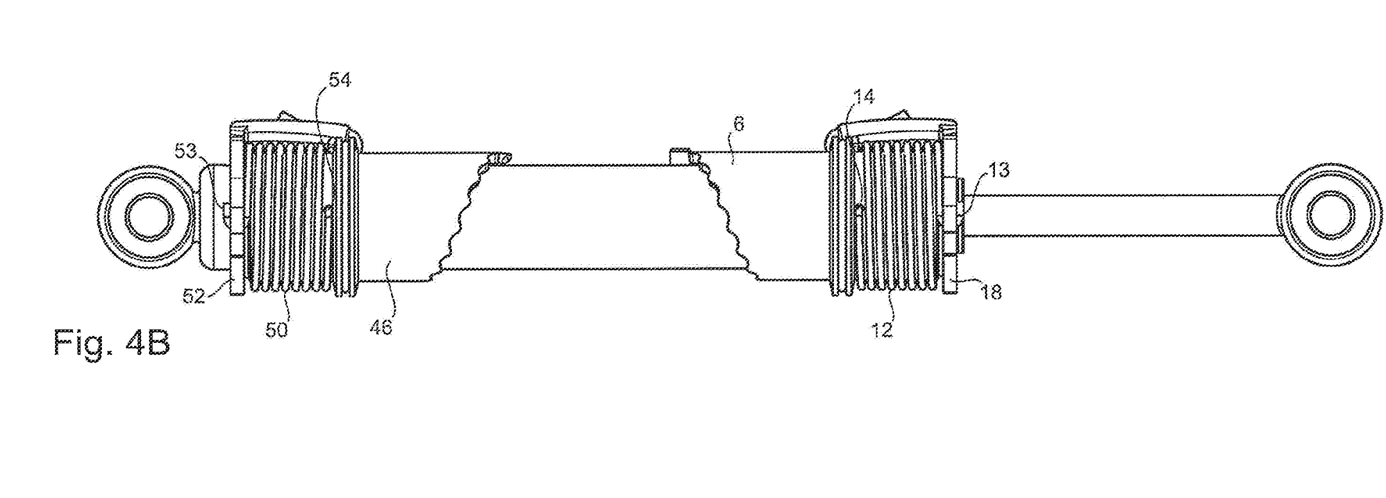
FIG. 4B the height limiter according to FIG. 4A in a second side view.

Further embodiments of a height limiter based on the preceding embodiments are shown in FIGS. 4A and 4B.

In addition to first sleeve element 6, a second sleeve element 46 is provided which, like first sleeve element 6, is rotatable with respect to main body 2 and has a helical second boundary 51. In particular, second boundary 51 has a different winding direction than first boundary 7. Sleeve elements 6, 51 are arranged such that boundaries 7, 51 face each other.

Furthermore, the designs for first sleeve element 6, first guide rail 19, first Bowden cable 10, first end 11 of first Bowden cable 10, first boundary 7, first guide element 18 and first spring element 23 are analogously transferable to second sleeve element 46, second guide rail 50, second Bowden cable 48, first end 49 of second Bowden cable 48, second boundary 51, second guide element 52 and second spring element 47.

In this case, first Bowden cable 10 and second Bowden cable 48 can be operated independently, so that the lower stop and the upper stop can be adjusted individually. It should be mentioned again that a stop means, that the pin element is limited in its movement, according to FIGS. 4A and 4B by first boundary 7 and second boundary 51. Second boundary 51 is in this case arranged between first end 8 of slot 3 and guide pin 5.

Height limiter 1 of FIG. 4B is equal to height limiter 4A, but shown in a different view. It can be seen here that first spring end 13 is rigidly connected to main body 2 by means of first guide element 18 and second spring end 14 is connected to first sleeve element 6. Similarly, first spring end 53 of second spring unit 50 is connected to second guide element 52 and second spring end 54 to second sleeve element 46.

Figure 5:
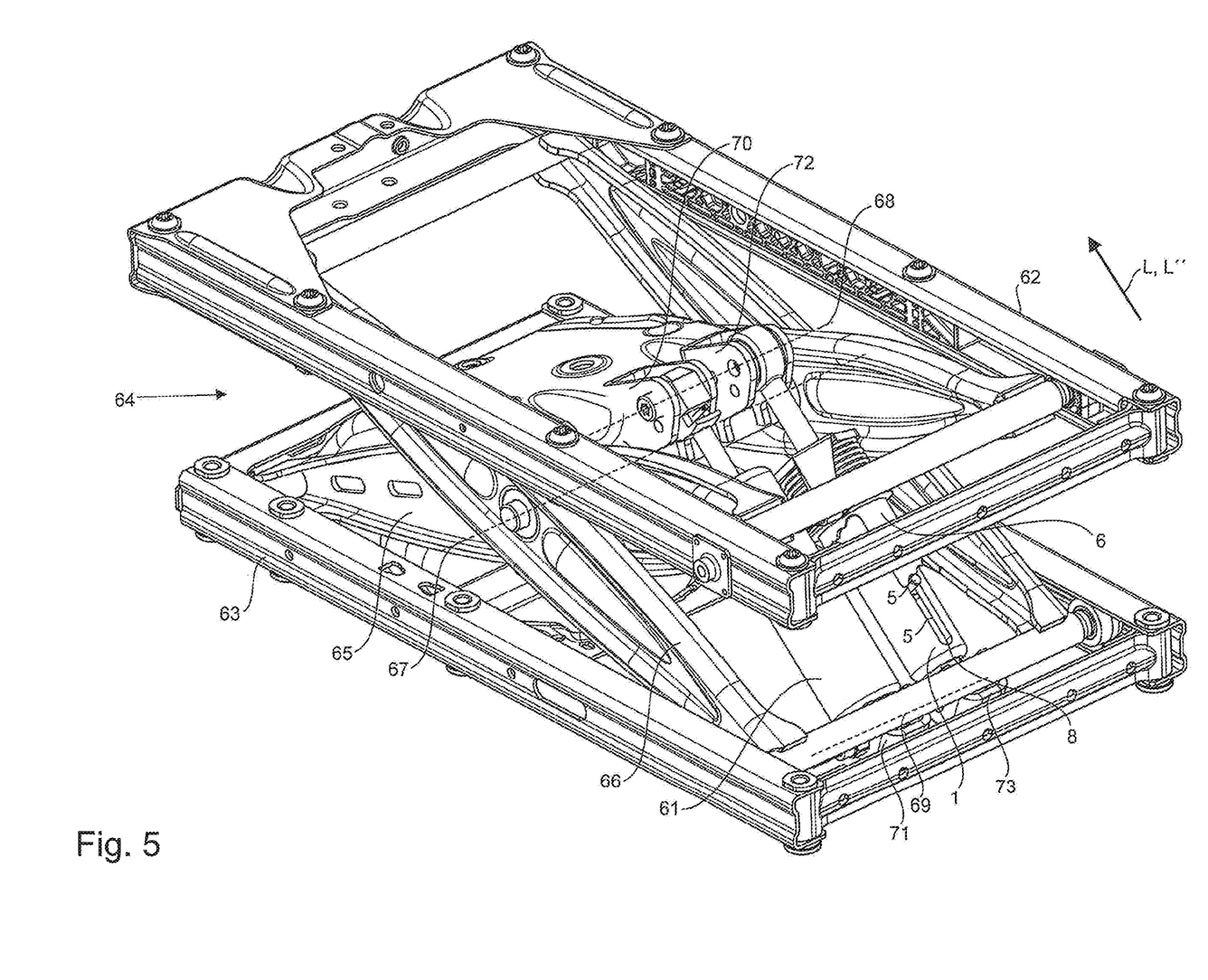
FIG. 5 the height limiter arranged in a vehicle seat.

FIG. 5 shows a possible attachment of height limiter 1 in a vehicle seat 60, only a lower part of vehicle seat 60 being shown.

In this case, an upper part 62 and a lower part 63 can be seen, upper part 62 being displaceable relative to lower part 63 and the movement of upper part 62 being guided by a scissor-type frame 64. Scissor-type frame 64 has a first scissor 65 and a second scissor 66, first scissor 65 and second scissor 66 are pivotably connected about a first axis of rotation 67.

Further, to damp the movement of upper part 62 relative to lower part 63, a damper 61 is provided which is pivotably connected by a first fastening element 70 about a second axis of rotation 68 to first scissor 65 and pivotably connected by a second fastening element 71 about a third axis of rotation to lower part 63. Height limiter 1 is pivotably connected by means of a third fastening element 72 about second axis of rotation 68 to first scissor-type support 65 and pivotably connected by means of a fourth fastening element 73 about the third axis of rotation to lower part 63. This means that damper 61 and height limiter 1 have the same distance from second axis of rotation 68 to third axis of rotation 69. In particular, extension direction L of height limiter 1 and an extension direction L" of damper 61 are arranged parallel to each other.

The deflection of upper part 62 with respect to lower part 63 is limited by height limiter 1, a deflection being upwardly limited by the stop of pin element 5 at first boundary 7 of first sleeve element 6 and downwardly limited by the stop of pin element 5 at first end 8 of slot 3. It is also conceivable that a second sleeve element (not shown here) may serve as a stop instead of first end 8.

All the features disclosed in the application documents are claimed as being essential to the invention provided that, individually or in combination, they are novel over the prior art.

LIST OF REFERENCE SIGNS

1 Height limiter
2 Main body
3 Slot
4 Piston rod element
5 Pin element
6 First sleeve element
7 First boundary
8 First end of the slot
9 Second end of the slot
10 First Bowden cable
11 First end of the first Bowden cable
12 First spring element
13 First spring end
14 Second spring end
15 First fastening eye
16 Second fastening eye
17 Elastic element
18 First guide element
19 First guide rail
20 Recess
21 Arrow
22 Distance
23 Pitch
24 Peak
25 Valley
26 First base section of the first guide element
27 Second base section of the first guide element
28 First end of the second base section
29 Second end of the second base section
30 First notch
31 First material entry
32 First section of the first material entry
33 Second section of the first material entry
34 First end of the first sleeve element
35 First end of the piston rod element
36 First slide element
37 Inner surface
38 First extension
39 Second extension
40 Second sliding element
41 Third sliding element
42 First section of the second sliding element
43 Second section of the second sliding element
44 First section of the third sliding element
45 Second section of the third sliding element
46 Second sleeve element
47 Second spring element
48 Second Bowden cable
49 First end of the second Bowden cable
50 Second guide rail
51 Second boundary
52 Second guide element
53 First end of the second spring element
54 Second end of the second spring element
60 Vehicle seat
61 Damper
62 Upper part
63 Lower part
64 Scissor action frame
65 First scissor
66 Second scissor
67 First axis of rotation
68 Second axis of rotation
69 Third axis of rotation
70 First fastening element
71 Second fastening element
72 Third fastening element
73 Fourth fastening element

What is claimed is:

1. An adjustable height limiter for a vehicle seat, comprising:
   a main body having a slot which has a first end and a second end;
   a piston rod element which is displaceable with respect to the main body having a pin element which is guided in the slot, wherein the pin element is fixed to the piston rod element; and
   a first sleeve element which is rotatable with respect to the main body and at least partially surrounds the main body, the first sleeve element having a first boundary which is helical with respect to the main body, the first boundary being arranged between the first end and the second end when viewed in the extension direction of the slot, and the pin element being arranged between the first end and the first boundary, wherein a movement of the piston rod element in a first direction is limited by the first boundary.

2. The adjustable height limiter according to claim 1, wherein the pin element extends through the slot.

3. The adjustable height limiter according to claim 1, wherein a first end of a first Bowden cable is connected to the first sleeve element, the first sleeve element being rotatable by actuation of the first Bowden cable.

4. The adjustable height limiter according to claim 3, wherein a first spring element is provided comprising a first spring end and a second spring end, the first spring end being connected to the main body and the second spring end to the first sleeve element.

5. The adjustable height limiter according to claim 1, wherein the first boundary is wave-shaped.

6. The adjustable height limiter according to claim 1, wherein the first boundary has a first planar section and a second planar section.

7. The adjustable height limiter according to claim 1, wherein a first fastening eye is arranged on the main body and a second fastening eye is arranged on the piston rod element, the first fastening eye and the second fastening eye each having an elastic element.

8. The adjustable height limiter according to claim 7, wherein the elastic element is made of a polyurethane elastomer.

9. The adjustable height limiter according to claim 3, wherein a first guide element is provided which is rigidly connected to the main body and is provided to guide the first Bowden cable.

10. An adjustable height limiter for a vehicle seat, comprising:
   a main body with a first cover element and a slot extending from a first end to a second end;
   a piston rod element displaceable with respect to the main body and comprising a pin element affixed to the piston rod element, the pin element moveable along a length of the slot by the piston rod element;
   a rotatably mounted base element displaceably arranged with respect to the main body and at least partially within the main body, the rotatably mounted base element comprising a helical first boundary positioned between the first end and the second end; and
   the first cover element having formed a first step when viewed in the transverse direction and the base element having formed a second step when viewed in the transverse direction, it being possible to bring the first step and the second step into contact.

11. A vehicle seat having an adjustable height limiter according to claim 1.

* * * * *